United States Patent
Grimm (10) Patent No.: US 10,504,249 B2
(45) Date of Patent: Dec. 10, 2019

(54) METHOD AND APPARATUS FOR GENERATING A TWO-DIMENSIONAL PROJECTION IMAGE FROM A THREE-DIMENSIONAL IMAGE DATA SET

(71) Applicant: Siemens Healthcare GmbH, Erlangen (DE)

(72) Inventor: Robert Grimm, Nuremberg (DE)

(73) Assignee: Siemens Healthcare GmbH, Erlangen (DE)

( * ) Notice: Subject to any disclaimer, the term of this patent is extended or adjusted under 35 U.S.C. 154(b) by 120 days.

(21) Appl. No.: 15/858,131

(22) Filed: Dec. 29, 2017

(65) Prior Publication Data
US 2018/0189985 A1    Jul. 5, 2018

(30) Foreign Application Priority Data
Dec. 30, 2016  (DE) .................. 10 2016 226 336

(51) Int. Cl.
*G06T 11/00* (2006.01)
*G06T 15/04* (2011.01)
(Continued)

(52) U.S. Cl.
CPC .............. *G06T 11/003* (2013.01); *G06T 7/73* (2017.01); *G06T 11/006* (2013.01); *G06T 15/04* (2013.01); *G06T 15/08* (2013.01); *G06T 2200/04* (2013.01); *G06T 2207/10081* (2013.01); *G06T 2207/10088* (2013.01); *G06T 2207/10104* (2013.01); *G06T 2207/10116* (2013.01); *G06T 2207/10136* (2013.01);
(Continued)

(58) Field of Classification Search
CPC .... G06T 15/08; G06T 2210/41; G06T 7/0012
See application file for complete search history.

(56) References Cited

U.S. PATENT DOCUMENTS

| 5,368,033 A | 11/1994 | Moshfeghi |
| 5,904,653 A | 5/1999 | Hatfield et al. |
(Continued)

OTHER PUBLICATIONS

Grimm, et al.: "V-Objects: Flexible Direct Multi-Volume Rendering in Interactive Scenes"; Tech. Rep., Institute of Computer Graphics and Algorithms, Vienna University of Technology; (2004).
(Continued)

*Primary Examiner* — Ross Varndell
(74) *Attorney, Agent, or Firm* — Schiff Hardin LLP (57) ABSTRACT

In a method and apparatus for generating a two-dimensional projection image from a three-dimensional image data set of an examination object, a three-dimensional image data set of the examination object having a number of voxels is provided to a computer wherein one scan value is associated with one voxel of the examination object. The computer determines at least one value from voxels respectively located along a viewing direction of the three-dimensional image data set, and their scan values, using at least one selection criterion. The at least one determined value is a value that differs from an upper limit value and a lower limit value of the scan values of the voxels located along the viewing direction. The at least one value is used for generating an image point in the two-dimensional projection image.

20 Claims, 2 Drawing Sheets

(51) Int. Cl.
*G06T 7/73* (2017.01)
*G06T 15/08* (2011.01)

(52) U.S. Cl.
CPC ............... *G06T 2207/30096* (2013.01); *G06T 2207/30101* (2013.01); *G06T 2210/41* (2013.01)

(56) References Cited

U.S. PATENT DOCUMENTS

| | | | |
|---|---|---|---|
| 6,510,241 B1* | 1/2003 | Vaillant | A61B 6/583 345/419 |
| 2008/0055308 A1 | 3/2008 | Dekel et al. | |
| 2010/0053159 A1 | 3/2010 | Visser | |
| 2013/0187918 A1* | 7/2013 | Alj | G06T 17/10 345/420 |
| 2016/0048984 A1* | 2/2016 | Frigo | G06T 11/008 382/131 |

OTHER PUBLICATIONS

Schubert, et al.: "Comparing GPU-based multi-volume ray casting techniques"; Computer Science-Research and Development; vol. 26; pp. 39-50; (2011).

* cited by examiner

METHOD AND APPARATUS FOR GENERATING A TWO-DIMENSIONAL PROJECTION IMAGE FROM A THREE-DIMENSIONAL IMAGE DATA SET

BACKGROUND OF THE INVENTION

Field of the Invention

The present invention concerns a method and an apparatus for generating a two-dimensional projection image from a three-dimensional image data set.

Description of the Prior Art

In medical science it is currently conventional to use medical apparatuses, such as X-ray, computed tomography, magnetic resonance or ultrasound apparatuses or PET scanners, which enable image data sets to be generated with a high resolution in the submillimeter range in all spatial directions, so three-dimensional scans or volume data sets can be created. However, the volume data sets created in this way have a greater quantity of data than image data sets of conventional two-dimensional images, so evaluation of the image data sets is relatively time-consuming if, for example, an evaluation has to be made using individual cross-sections or slices, or cross-sections or slices have to be at least predominantly used for diagnosis. Furthermore, there is the risk that details, which are only visible in some of the cross-sections or slices, will be overlooked.

It is therefore customary to prepare the three-dimensional image data sets with the aid of a computer in order to achieve an improved display and to optionally provide a physician with interpretation aids. Two methods are currently used for this, and these allow a visualization of the three-dimensional image data sets in a two-dimensional projection image. With Maximum Intensity Projection (MIP), the data point or voxel which has the greatest or maximum intensity is chosen along the viewing direction of the medical imaging equipment. The lightest point along each viewing direction is therefore determined and only this is used for display in the two-dimensional projection image. With what is known as Thin MIP, only a partial volume is displayed. MIP is used for displaying examination objects with a strong signal, for example for displaying blood vessels.

With Minimum Intensity Projection (minIP), the data point or voxel that has the smallest or minimum intensity is chosen along the viewing direction of the medical imaging equipment. The darkest point along each viewing direction is therefore determined and only this is used for display in the two-dimensional projection image. MinIP is used for displaying examination objects having low signal intensity, in other words low-signal examination objects, such as the lungs or bronchial tubes.

However, the two methods provide only a limited option for displaying three-dimensional image data sets, since only strong-signal or low-signal regions of an examination object can be highlighted. Regions having medium signal intensity cannot be adequately visualized, the more precise examination of which is often likewise desirable.

When creating three-dimensional image data sets different evaluations can be made. Different parameters that identify the recorded examination object can be determined as scan values, such as blood flow or an apparent diffusivity, in other words a direction-dependent spread of fluid in the examination object (Apparent Diffusion Coefficient, ADC). In order to display a number of these scan values in a two-dimensional image, projection images have previously been individually generated from a number of image data sets, which images are then combined using known image processing methods, although this is similarly very time-consuming. Furthermore, the number of image data sets for generating the respective projection image are first analyzed independently of each other, in other words the image points of a first projection image are potentially determined using different voxels or depth ranges to the image points of a second projection image. This has the drawback that during subsequent combining of the multiple projection images, potentially different or inconsistent information is displayed.

SUMMARY OF THE INVENTION

An object of the invention to disclose a method for generating two-dimensional projection images which allows improved visualization of three-dimensional image data sets.

In accordance with the invention, a three-dimensional image data set of the examination object having a number of voxels is provided to a computer, wherein one scan value respectively is associated with one voxel of the examination object. In a further step at least one value is determined or selected by the computer from voxels located along a viewing direction or direction of projection of the three-dimensional image data set, and their scan values, using at least one selection criterion. The at least one determined value is a value that differs from an upper and a lower limit value of the scan values of the voxels located along the viewing direction. The at least one value determined in this way is then used by the computer for generating or displaying an image point in the two-dimensional projection image.

All image points in the two-dimensional projection image are generated in this manner, and, the resulting two-dimensional projection image is made available from the computer in electronic form, as a data file.

The scan value of a voxel is taken to mean a grayscale value of the voxel, or a medical parameter identifying a property of the examination object, such as the apparent diffusion coefficient ADC. The upper limit value is defined by the scan value having the maximum intensity or the maximum or greatest value; the lower limit value is defined by the scan value having the minimum intensity or the minimum or smallest value. Because the value that is determined using the scan values of the voxels located along the viewing direction, neither the scan value having the minimum intensity nor the scan value having the maximum intensity is selected. Instead the value is determined using a further selection criterion. This has the advantage that a purposeful selection can be made of the values to be displayed in the projection image, for example as a result of criteria that correlate with a state of the examination object, and can be used as identification aids. If it is known, for example, that a scan value, in a particular size interval, is an indication of a tumor and a number or total of all scan values located in this size interval is determined as the value, the tumor can be displayed more specifically.

To attain a quantitative display of the examination object in addition to a visual one, in an embodiment a first three-dimensional image data set of the examination object, having a number of first voxels, is provided in a method for generating a two-dimensional projection image, wherein a first scan value is associated with a first voxel, and a second three-dimensional image data set of the examination object having a number of second voxels is provided, wherein a second scan value is associated with a second voxel. Using first voxels respectively located along a viewing direction of the first three-dimensional image data set, and their scan values, at least one first value and at least one position of the at least one first voxel, whose scan value is used for determining the at least one value, is determined or selected using at least one selection criterion. Furthermore, at least one scan value of a second voxel of the second three-dimensional image data set, corresponding to the at least one position of the at least one first voxel, is determined for determining a second value. At least the second value is then used for generating or displaying the image point in the two-dimensional projection image. In other words: in the second image data set, that voxel or its scan value, or those voxels or their scan values, which should be associated with the same spatial coordinates within the examination object, like the voxel(s) of the first image data set, which were used to determine the first value, is/are chosen for determining the image point. The value determined using the first image data set is therefore clearly spatially associated with one or more voxel(s). When determining the second value from the second three-dimensional image data set, only these limited positions are then considered. A projection therefore occurs only for the first image data set using a selection criterion ("Projection Rule"). The second image data set is then analyzed using only the first value used for projection, as only those voxels of the second image data set are still considered that were also considered when determining the first value, for example only those voxels whose scan values lie in a particular value range ("Selection Rule"). If a number of first voxels contribute to the determination of the first value, a number of positions or a number of second voxels at these positions, is therefore also considered when determining the second value. A number of three-dimensional image data sets thus can be linked in a two-dimensional projection image, and this ensures that the same voxels or the exact same spatial coordinates are visualized in the two-dimensional projection image. A consistent spatial allocation is thereby enabled.

The three-dimensional image data set and/or the first three-dimensional image data set and/or the second three-dimensional image data set are preferably generated using raw data of the examination region, wherein the raw data are acquired using medical imaging equipment. An imaging device of this kind is, for example, a magnetic resonance scanner, whereby the examination object firstly generates electrical signals or magnetic resonance signals as raw data, and these are then associated with individual voxels in order to create a three-dimensional image data set. When using a computed tomography apparatus, absorption profiles of the examination object are created from different directions as raw data, and using such profiles, volume structure of the examination object is determined. The first and second three-dimensional image data sets can be acquired or generated therewith. Other medical imaging equipment may be used to produce the three-dimensional image data set.

Furthermore, it is preferred to use some or all of the scan values of the number of voxels located along a viewing direction as a selection criterion for determining the at least one value and/or a total or number of the first scan values of the number of first voxels located along a viewing direction for determining the at least one first value. The total intensity of a signal that occurs along the viewing direction thus is considered.

For further differentiation, it is advantageous to use some or all of the scan values of the number of voxels located along a viewing direction, which fall below or exceed at least one threshold value, as a selection criterion for determining the at least one value and/or a total of the first scan values of the number of first voxels located along a viewing direction, which fall below or exceed at least one threshold value, as a selection criterion for determining the at least one first value. At least one threshold value means that a number of threshold values can be defined and, for example, the scan values of those voxels that fall below a first threshold value and, moreover, the scan values of those voxels that exceed a second threshold value are considered when determining the value. For example, statements can thereby be made about the depth range over which conspicuous tissue structure extends.

A quantile, for example a 25th percentile, and/or a median of the scan values of the number of voxels located along a viewing direction, is used as a selection criterion for determining the at least one value as a threshold value, and/or a quantile, for example a 25th percentile, and/or a median of the first scan values of the plurality of first voxels located along a viewing direction, is used as a selection criterion for determining the at least one first value. A particular distribution of the scan values thus can be purposefully displayed, for example all values that fall below a particular threshold value and are therefore characteristic of conspicuous tissue. The scan values of all voxels located in the viewing direction contribute to forming of the value here as well; very different, individual scan values are less decisive, however.

In a further preferred embodiment, some or all of the scan values of the number of voxels located along a viewing direction, which lie within at least one value range, in other words at least between a lower threshold value and an upper threshold value, are used as a selection criterion for determining the at least one value and/or a total or number of the first scan values of the number of first voxels located along a viewing direction, which lie within at least one value range, in other words at least between a lower threshold value and an upper threshold value, are used as a selection criterion for determining the at least one first value. Lying within at least one value range means that a number of value ranges can be defined and, for example, the scan values of those voxels that lie within a first value range between a first threshold value and a second threshold value, and, moreover, the scan values of those voxels which lie within a second value range between a third threshold value and a fourth threshold value, are considered when determining the value. Particular value ranges or value intervals can be defined as standard (reference) values for different symptoms, so deviations from the standard range can be purposefully displayed.

A further possibility is to use a percentage of the scan values of the number of voxels located along a viewing direction, which values fall below or exceed at least one threshold value and/or which lie at least within a value range, as a selection criterion for determining the at least one value, and/or a percentage of the first scan values of the number of first voxels located along a viewing direction, which values fall below or exceed at least one threshold value and/or which lie at least within a value range, as a selection criterion for determining the at least one first value. The advantage again is that depth information is also considered. In other words it is immediately obvious whether only a single voxel or a number of voxels along the viewing direction has or have a scan value identifying tissue afflicted by a tumor.

In another embodiment a mean of the scan values of the number of voxels located along a viewing direction, in particular a mean of the scan values of the number of voxels located along the viewing direction, which fall below or exceed at least one threshold value and/or which lie at least within a value range, is used as a selection criterion for determining the at least one value, and/or a mean of the first scan values of the number of first voxels located along a viewing direction, in particular a mean of the scan values of the number of voxels located along the viewing direction, which fall below or exceed at least one threshold value and/or which lie at least within a value range, is used as a selection criterion for determining the at least one first value. The determined value thus corresponds to a mean of all voxels along a viewing direction, or their scan values, so the scan values of all voxels located in the viewing direction are considered equally, or those voxels or scan values within particular value ranges or above or below particular threshold values.

In a further preferred embodiment one or more scan value(s) of the number of voxels located along a viewing direction, which voxels, based on the viewing direction, lie in at least one particular depth interval, is/are used as a selection criterion for determining the at least one value, and/or one or more first scan value(s) of the number of first voxels located along a viewing direction, which voxels, based on the viewing direction, lie in a particular depth interval, is/are used as a selection criterion for determining the at least one first value. The value thus is determined using a particular spatial region, in other words only those voxels located one behind the other in the viewing direction, or only scan values of these voxels that lie at a particular depth within the examination object, for example that lie within a particular organ whose extent and position is known, are considered.

When determining the at least one first value from the first image data set, a voxel having a maximum scan value and/or a voxel having minimum scan value can be selected as the first value. By combining the first image data set and the second image data set, regions having maximum and/or minimum signal intensity can be quantitatively acquired, since the image point displayed in the two-dimensional projection image exhibits values of the first and of the second image data sets of the same spatial position or positions within the examination object.

For improved visualization, at least two value ranges and/or at least one threshold value is/are defined in a preferred embodiment of the method, and the image point is displayed in the two-dimensional projection image in a first display form, in particular a first color, if the determined value lies within a first value range and/or falls below the at least one threshold value and/or the image point is displayed in the two-dimensional projection image in a second display form, in particular a second color, if the determined value lies within a second value range and/or exceeds the at least one threshold value. Conspicuous and inconspicuous regions of the examination object are thereby displayed clearly demarcated from each other. The value ranges and threshold values are defined, for example, using standard values, which can be used as interpretation aids for a diagnosis of the examination object.

The above object also is achieved by an apparatus for carrying out the method described above, which includes medical imaging equipment designed to acquire raw data from an examination region. Furthermore, the apparatus has a control and evaluation computer that determines three-dimensional image data sets using the raw data and that generates two-dimensional projection images by implementing the method according to the invention.

DESCRIPTION OF THE PREFERRED EMBODIMENTS

Figure 1:
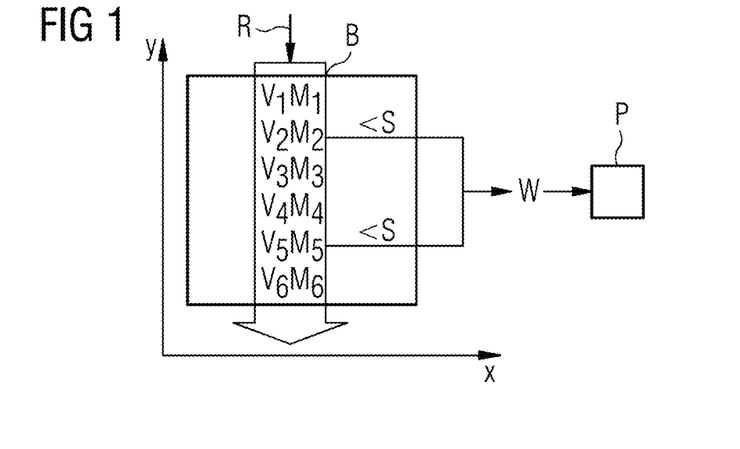
FIG. 1 shows a three-dimensional image data set along a viewing direction, from which at least one value is determined for generating an image point in a two-dimensional projection image.

FIG. 1 schematically shows a method for generating a two-dimensional projection image from a three-dimensional image data set of an examination object, more precisely, a three-dimensional image data set B along a viewing direction R, which in the present case runs in the y-direction. The three-dimensional image data set of the examination object has a number of voxels $V_i$, in the present case $V_1$ to $V_6$. Each voxel $V_i$ has one scan value $M_i$ associated therewith, in the present case $M_1$ to $M_6$, which lie along the viewing direction R of the three-dimensional image data set B. The individual voxels $V_i$ are each part of a slice of the examination object O. The three-dimensional image data set B was generated using raw data of the examination object, which were acquired using medical imaging equipment, such as, for example, that illustrated in FIG. 4.

Using a selection criterion, a value W is determined from the voxels $V_1$ to $V_6$ and their scan values $M_1$ to $M_6$. In the present case the scan values $M_1$ to $M_6$ represent signal intensities between 0 and 100 a.u., which were generated by the respective voxels $V_1$ to $V_6$. A threshold value S of 20 a.u, for example, can be used as the selection criterion. A number of the scan values $M_1$ to $M_6$, which fall below this threshold value S, are then used in order to produce the value W for displaying an image point in a two-dimensional projection image P. In the present case the scan values $M_2$ and $M_5$ are smaller than the threshold value S and therefore do not contribute to determination of the value W.

A mean, a total, or a number of the scan values, a total of the scan values which lie within a value range, or a percentage of the scan values which fall below or exceed a particular threshold value and/or which lie within a particular value range, in other words between a lower limit value and an upper limit value, is used as a further selection criterion. Furthermore, scan values of individual voxels can be selected which should be associated with a particular depth range along the viewing direction B.

Figure 2A:
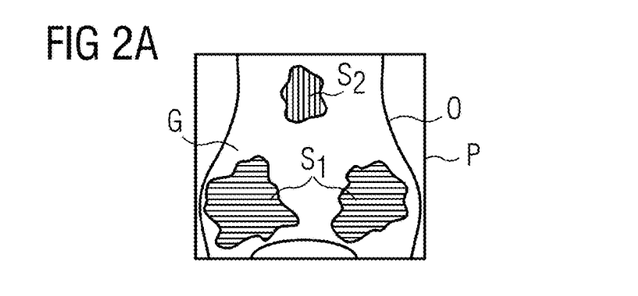
FIG. 2A shows a two-dimensional projection image, in which the value of the image points is determined using a first selection criterion.

FIG. 2A shows a projection image P of an examination object O, in which in each case the scan value $M_i$ of voxels $V_i$, located along a viewing direction B, having maximum intensity is determined and displayed as the image point. If the scan value $M_i$ lies above a first threshold value $S_1$, this is displayed by a horizontal hatched region. If the scan value $M_i$ having maximum intensity of voxels $V_i$ located along the viewing direction B lies below a second threshold value $S_2$, this is displayed in FIG. 2A by the vertically hatched region. If the scan value $M_i$ having maximum intensity of voxels $V_i$ located along the viewing direction B lies between the first threshold value $S_1$ and the second threshold value $S_2$, in other words within a value range G, this is identified by a non-hatched region. For example, the scan values in the present case are apparent diffusion coefficients (ADC), so for example necrotic tissue, which is associated by scan values $M_i$ of high intensity, can be purposefully displayed.

Figure 2B:
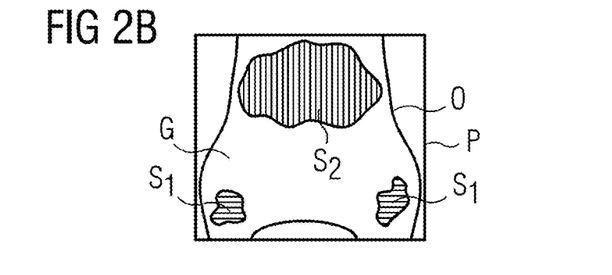
FIG. 2B shows a two-dimensional projection image, in which the value of the image points is determined using a second selection criterion.

By contrast, in the projection image P in FIG. 2B of the same examination object O, the scan value $M_i$ of voxels $V_i$ having minimum intensity located along a viewing direction B was in each case displayed as the value and therefore as the image point. If this value lies below the second threshold value $S_2$, this is displayed by a vertically hatched region. If the selected value of voxels $V_i$ located along the viewing direction B lies above a first threshold value $S_1$, this is displayed in FIG. 2B by horizontally hatched regions. If all scan values $M_i$ of voxels $V_i$ located along the viewing direction B lie between the first threshold value $S_1$ and the second threshold value $S_2$, in other words within a value range G, this is identified by non-hatched regions. For example, tissue afflicted by a tumor, which is associated by scan values $M_i$ of low intensity, can be purposefully displayed thereby.

Figure 2C:
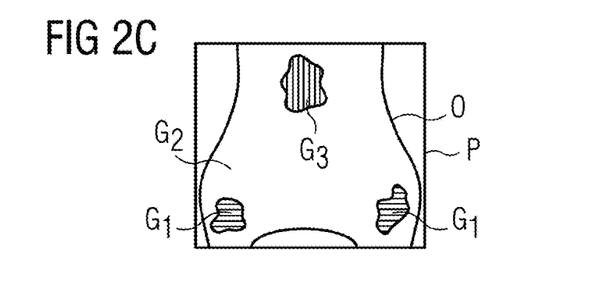
FIG. 2C shows a two-dimensional projection image, in which the value is determined using a third selection criterion.

FIG. 2C accordingly shows an inventively generated projection image P of the examination object O, in which a value of the respective image points is determined using a selection criterion that differs from the scan value $M_i$ having the maximum or minimum intensity, in the present case using three value ranges $G_1$, $G_2$, $G_3$ or two threshold values which separate the value ranges from each other, a first threshold value which separates the value ranges $G_1$ and $G_2$ from each other, and a second threshold value which separates the value ranges $G_1$ and $G_2$ from each other. All scan values $M_i$ are considered in the visualization in the projection image. If at least one of the scan values $M_i$ of the voxels $V_i$ located along the viewing direction B exceeds the first threshold value, but lies below a second threshold value, in other words is in the mean value range $G_2$, and, moreover, none of the scan values $M_i$ falls below the first threshold value, the image points are displayed in a first color (non-hatched region). If at least one of the scan values $M_i$ of the voxels $V_i$ located along the viewing direction B falls below a first threshold value and therefore lies within a value range $G_1$, the image point is displayed in a second color (horizontally hatched shape). In all other cases in which at least one of the scan values $M_i$ lies within a value range $G_3$, the image point is displayed in a third color (vertically hatched shape). The scan values lying within the second value range $G_2$ can be effectively displayed thereby.

Figure 3:
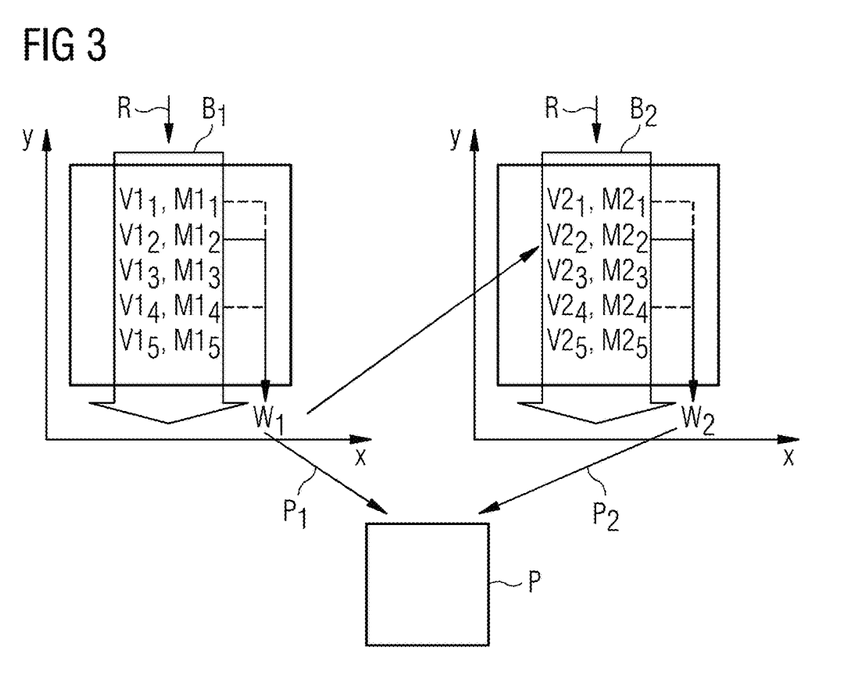
FIG. 3 shows a first and a second three-dimensional image data set along a viewing direction, from which first and second values are determined for generating an image point in a two-dimensional projection image.

FIG. 3 schematically shows a method for generating a two-dimensional projection image from three-dimensional image data sets of an examination object, more precisely from two three-dimensional image data sets $B_1$ and $B_2$ along a viewing direction R, which in the present case again runs in the y-direction. The first three-dimensional image data set Bi and the second three-dimensional image data set $B_2$ were again generated from raw data of the examination region which was in each case acquired with medical imaging equipment, for example in FIG. 4.

The first three-dimensional image data set $B_1$ of the examination object O again comprises a plurality of voxels $V1_i$ with which a first scan value $M1_i$ respectively is associated. The second three-dimensional image data set $B_2$ of the examination object O similarly comprises a plurality of voxels $V2_i$, with which a second scan value $M2_i$ respectively is associated. Overall, for example five slices of the examination object O were created along the y-direction, so the image data sets along the viewing direction each comprise five voxels $V1_1$ to $V1_5$ or $V2_1$ to $V2_5$ having scan values $M1_1$ to $M1_5$ or $M2_1$ to $M2_5$. The examination object O therefore has, for example, a thickness of five voxels $V1_1$ to $V1_5$ or $V2_1$ to $V2_5$ along the viewing direction B having scan values $M1_1$ to $M1_5$ or $M2_1$ to $M2_5$.

A first value $W_1$ is determined from first voxels $V1_i$ or $V1_1$ to $V1_5$ located along the viewing direction R of the first three-dimensional image data set $B_1$, and their scan values $M1_i$ or $M1_1$ to $M1_5$. Furthermore, a position of the first voxels $V1_i$, whose scan values $M1_i$ contribute to the determination of the first value $W_1$, is determined. For example, the voxel having the maximum scan value or having maximum intensity is used as the selection criterion, in the present case the voxel $V1_2$ having the associated scan value $M1_2$, which, based on the viewing direction, is associated with the second position. The scan value of that voxel of the second image data set $B_2$, whose position corresponds to that of the first voxel $V1_2$ forming the first value $W_1$, is then determined as the second value $W_2$, in the present case the voxel $V2_2$ having the associated scan value $M2_2$ therefore. Firstly, a first projection image $P_1$ can be generated from the value $W_1$ and a second projection image $P_2$ from the value $W_2$ from the three-dimensional image data sets $B_1$ and $B_2$ and can be examined separately from each other. For example, anatomical structures are highlighted in the first projection image $P_1$, while the second projection image $P_2$ allows the associated quantitative examination. To facilitate interpretation of the projection images $P_1$ and $P_2$, the images are then displayed overlaid in a projection image P, whereby when generating an image point in the two-dimensional projection image P, the first value $W_1$ as well as the second value $W_2$ are considered. Two different scan values, but which originate from the same spatial position, thereby contribute to displaying of the image point, whereby the scan values are advantageously quantified.

Instead of selecting a single voxel $V1_2$ as described above, the value $W_1$ can also be determined for example using a total of the scan values $M1_i$, which lie within a particular value range. According to this selection criterion or using this imaging rule for the first projection image $P_1$, the voxels $V1_1$ and $V1_4$ along the viewing direction R are selected in the present case for determining the value $W_1$ (illustrated by broken lines in FIG. 3). In the second image data set $B_2$ the scan values $M2_1$ and $M2_4$ of the voxels $M2_1$ and $M2_4$ are then likewise considered, for example likewise their total, for generating the second value $W_2$.

As a further selection criterion, those which allow a clear spatial association for the voxels to be used from the second three-dimensional image data set can also be considered, for example a total or number of the first scan values, a total of the first scan values which lie between a lower limit value and an upper limit value, or scan values or their percentage which fall below or exceed particular threshold values and/or lie within particular value ranges. Furthermore, scan values of individual voxels can be selected which should be associated with a particular depth range along the viewing direction.

Figure 4:
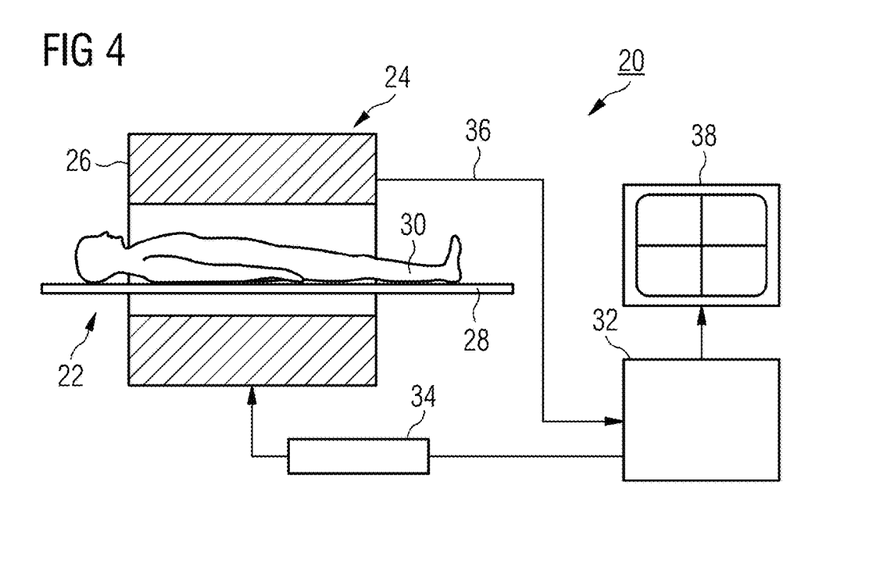
FIG. 4 schematically illustrates an apparatus for carrying out the method, a medical image recording equipment and a control and evaluation computer.

FIG. 4 schematically illustrates an apparatus 20 for carrying out the method. The apparatus 20 has medical imaging equipment 22 for acquiring raw data of an examination region of a patient 30, which is, for example, a magnetic resonance scanner. The medical imaging equipment has a magnet system 24 for generating a gradient field, which is accommodated in a tubular basic body 26. The individual gradient coils, having different effective directions, of the magnetic systems 24 are not shown in FIG. 4 for reasons of simplification. The apparatus 20 comprises an arrangement 28 for recording the patient 30, in the present case an examination table on which the patient 30 is supported and which can be positioned inside the tubular basic body 26 and can be moved through the magnet system 24 of the medical imaging equipment 22. In the situation shown in FIG. 4 the examination table 28 is arranged inside the basic body 26, so at least one region, which is to be examined, of the patient 30 is in each case penetrated by the magnetic field of the gradient coils.

The apparatus 20 also has a control and evaluation computer 32 for switching (activation) the magnet system 24. Furthermore, the control and evaluation computer is designed for determining three-dimensional image data sets using the raw data and for generating a two-dimensional projection image. A gradient amplifier 34 is expediently interconnected between the control and evaluation computer 32 and the magnet system 24.

The signals supplied by the magnet system 24, in the present case magnetic resonance signals of the examined region of the patient 30 or of the examination object, are transmitted by way of a signal line 36 to the control and evaluation computer 32. The control and evaluation computer 32 is also connected to a monitor 38 on which the generated two-dimensional projection image is displayed.

Although modifications and changes may be suggested by those skilled in the art, it is the intention of the Applicant to embody within the patent warranted hereon all changes and modifications as reasonably and properly come within the scope of the Applicant's contribution to the art.

The invention claimed is:

1. A method for generating a two-dimensional projection image from a three-dimensional image data set of an examination object, said method comprising:
   in a computer, obtaining a three-dimensional image data set of an examination object, said three-dimensional image data set comprising a plurality of voxels, with each of said voxels having one scan value of the examination object associated therewith;
   in said computer, determining at least one projection image value from selected voxels, and the respective scan values of the selected voxels, that are situated along a viewing direction of the three-dimensional image data set, using at least one selection criterion to select said selected voxels that causes said at least one projection image value to have a value that differs from an upper limit value and a lower limit value of the respective scan values of the voxels situated along said viewing direction;
   in said computer, using, as said at least one selection criterion, a number of the respective scan values of the voxels located along said viewing direction that have a value having a selected relationship to a threshold value, and selecting said selected relationship to be one of values above said threshold value and values below said threshold value;
   in said computer, selecting said number of the respective scan values of said voxels located along said viewing direction that satisfy said at least one selection criterion as one number selected from the group consisting of all of said scan values that satisfy said selection criterion and a percentage that is less than all of said Scan values that satisfies said selection criterion;
   in said computer, generating an image point in a two-dimensional projection image from said at least one projection image value, and repeating the determining of said at least one projection image value and the generating of an image point in the two-dimensional projection image therefrom, for all image points in said two-dimensional projection image; and
   producing said two-dimensional projection image from all of said image points generated respectively from said projection image values, and making said two-dimensional projection image available from the computer in electronic form as a data file.

2. The method as claimed in claim 1 comprising obtaining said three-dimensional image data set in said computer by receiving, into said computer, raw data acquired from the examination object by medical imaging equipment and, in said computer, generating said three-dimensional image data set from said raw data.

3. The method as claimed in claim 1 comprising using, as said at least one selection criterion, all of the respective scan values of the plurality of voxels located along said viewing direction.

4. The method as claimed in claim 1 comprising using, as said at least one selection criterion, a quantile of the respective scan values of the plurality of voxels located along said viewing direction.

5. The method as claimed in claim 1 comprising using, as said at least one selection criterion, a number of the respective scan values of the plurality of voxels located along said viewing direction that are within a specified value range.

6. The method as claimed in claim 5 comprising using, as said at least one selection criterion, a number of the respective scan values of the voxels located along said viewing direction that have a value having a selected relationship to a threshold value, and selecting said selected relationship to be one of values above said threshold value and values below said threshold value.

7. The method as claimed in claim 1 comprising using, as said at least one selection criterion, at least one respective scan value of the plurality of voxels located along said viewing direction that is in a predetermined depth interval with respect to said viewing direction.

8. The method as claimed in claim 1 comprising:
   displaying said two-dimensional projection image at a display monitor in communication with said computer; and
   in said computer, defining at least one display appearance criterion and, in said two-dimensional projection image displayed at said display monitor, displaying each image point with an image point display appearance depending on a relationship of the respective projection image value, from which the respective image point was generated, relative to said at least one display appearance criterion.

9. The method as claimed in claim 8 wherein said display appearance is color.

10. The method as claimed in claim 8 wherein said at least one display appearance criterion comprises two different value ranges, and displaying said respective image point with a first display appearance when the respective projection image value thereof is within a first of said two ranges, and displaying a respective image point with a second display appearance when the projection image value thereof is within a second of said two value ranges.

11. The method as claimed in claim 8 wherein said at least one selection criterion is a threshold, and displaying the respective image point with a first display appearance when the respective projection image value thereof is below said threshold, and displaying the respective image point with a second display appearance when the projection image value thereof is above said threshold.

12. A method for generating a two-dimensional projection image from multiple three-dimensional image data sets, comprising:
in a computer, obtaining a first three-dimensional image data set of an examination object, said first three-dimensional image data set comprising a plurality of first voxels, each of said first voxels having one scan value of the examination object associated therewith;
in said computer, obtaining a second three-dimensional image data set of the examination object, said second three-dimensional image data set comprising a plurality of second voxels, each of said second voxels having one scan value of the examination object associated therewith;
in said computer, using at least one selection criterion applied to the respective scan values of a plurality of said first voxels along a viewing direction of the first three-dimensional image data set to determine at least one first projection image value and at least one position of at least one first voxel;
in said computer, determining a scan value of a second voxel of the second three-dimensional image data set that corresponds in position to said position of said first voxel for which said first projection image value was determined, and using the scan value of said second voxel at said corresponding position as a second projection image value;
in said computer, using said second projection image value in order to generate an image point in a two-dimensional projection image;
in said computer, repeatedly determining said first projection image value and a respective second projection image value therefrom individually for all image points in said two-dimensional projection image; and
making the two-dimensional projection image available from the computer in electronic form, as a data file.

13. The method as claimed in claim 12 comprising using, as said at least one selection criterion, a number of the respective scan values of the first voxels located along said viewing direction that have a value having a selected relationship to a threshold value, and selecting said selected relationship to be one of values above said threshold value and values below said threshold value.

14. The method as claimed in claim 12 comprising selecting said number of the respective scan values of said first voxels located along said viewing direction that satisfy said at least one selection criterion as one number selected from the group consisting of all of said scan values that satisfy said selection criterion, and a percentage that is less than all of said scan values that satisfies said selection criterion.

15. The method as claimed in claim 12 comprising using, as said at least one selection criterion, a quantile of the respective scan values of the plurality of first voxels located along said viewing direction.

16. The method as claimed in claim 12 comprising using, as said at least one selection criterion, a number of the respective scan values of the plurality of first voxels located along said viewing direction that are within a specified value range.

17. The method as claimed in claim 12 comprising using, as said at least one selection criterion, at least one respective scan value of the plurality of first voxels located along said viewing direction that is in a predetermined depth interval with respect to said viewing direction.

18. The method as claimed in claim 12 comprising:
displaying said two-dimensional projection image at a display monitor in communication with said computer; and
in said computer, defining at least one display appearance criterion and, in said two-dimensional projection image displayed at said display monitor, displaying each image point with an image point display appearance depending on a relationship of the respective projection image value, from which the respective image point was generated, relative to said at least one display appearance criterion.

19. A medical imaging apparatus comprising:
a raw data acquisition scanner;
a computer configured to operate said raw data acquisition scanner in order to acquire raw data from an examination object situated in the raw data acquisition scanner;
said computer being configured to generate a three-dimensional image data set of an examination object from said raw data, said three-dimensional image data set comprising a plurality of voxels, with each of said voxels having one scan value of the examination object associated therewith;
said computer being configured to determine at least one projection image value from selected voxels, and the respective scan values of the selected voxels, that are situated along a viewing direction of the three-dimensional image data set, using at least one selection criterion to select said selected voxels that causes said at least one projection image value to have a value that differs from an upper limit value and a lower limit value of the respective scan values of the voxels situated along said viewing direction;
said commuter being configured to use, as said at least one selection criterion, a number of the respective scan values of the voxels located along said viewing direction that have a value having a selected relationship to a threshold value, and to select said selected relationship to be one of values above said threshold value and values below said threshold value;
said computer being configured to select said number of the respective scan values of said voxels located along said viewing direction that satisfy said at least one selection criterion as one number selected from the group consisting of all of said scan values that satisfy said selection criterion, and a percentage that is less than all of said scan values that satisfies said selection criterion;
said computer being configured to generate an image point in a two-dimensional projection image from said at least one projection image value, and to repeat the determination of said at least one projection image value and the generation of an image point in the two-dimensional projection image therefrom, for all image points in said two-dimensional projection image; and
said computer being configured to produce said two-dimensional projection image from all of said image points generated respectively from said projection image values, and to make said two-dimensional projection image available from the computer in electronic form as a data file.

20. A medical imaging apparatus comprising:

a raw data acquisition scanner;

a computer configured to operate the raw data acquisition scanner in order to acquire first raw data from an examination object situated in the raw data acquisition scanner, and in order to acquire second raw data from the examination object;

said computer being configured to generate a first three-dimensional image data set of the examination object from said first raw data, said first three-dimensional image data set comprising a plurality of first voxels, each of said first voxels having one scan value of the examination object associated therewith;

said computer being configured to generate a second three-dimensional image data set of the examination object from said second raw data, said second three-dimensional image data set comprising a plurality of second voxels, each of said second voxels having one scan value of the examination object associated therewith;

said computer being configured to use at least one selection criterion applied to the respective scan values of a plurality of said first voxels along a viewing direction of the first three-dimensional image data set to determine at least one first projection image value and at least one position of at least one first voxel;

said computer being configured to determine a scan value of a second voxel of the second three-dimensional image data set that corresponds in position to said position of said first voxel for which said first value was determined, and using the scan value of said second voxel at said corresponding position as a second projection image value;

said computer being configured to use said second projection image value in order to generate an image point in a two-dimensional projection image;

said computer being configured to repeatedly determine said first projection image value and said respective second projection image value therefrom individually for all image points in said two-dimensional projection image; and said computer being configured to make the two-dimensional projection image available from the computer in electronic form, as a data file.

* * * * *